Figure 1:
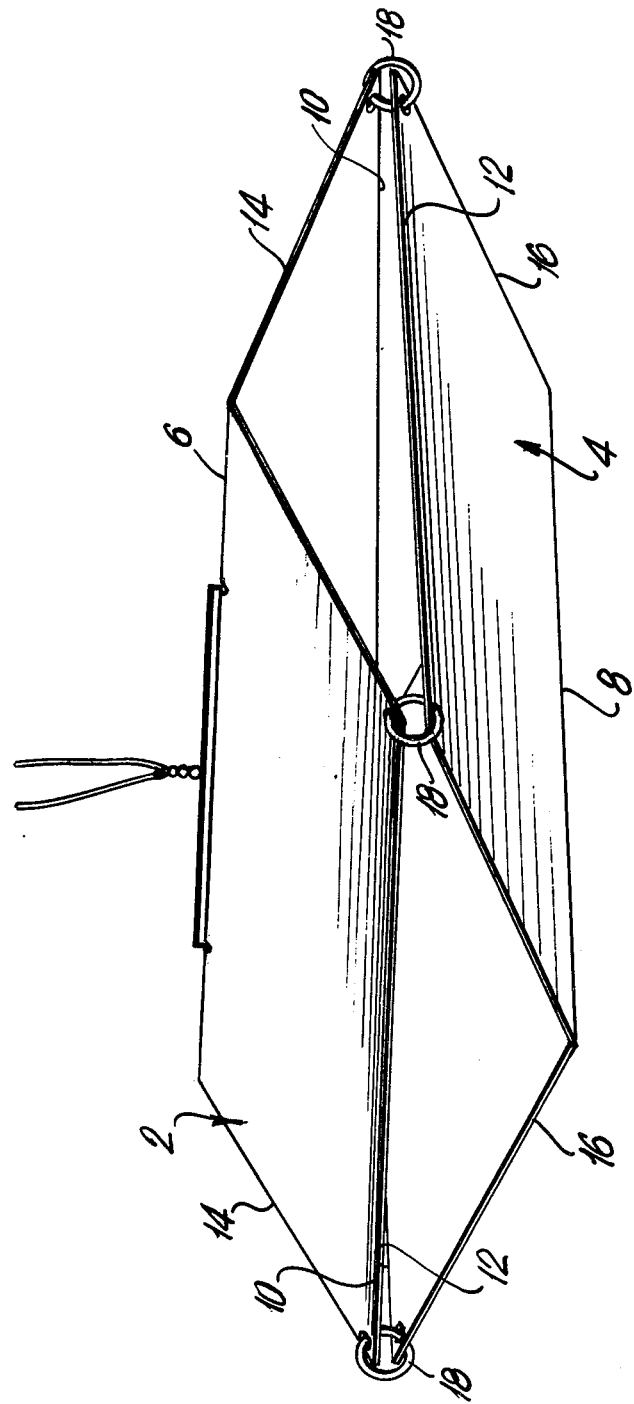

United States Patent [19]

Capizzi et al.

[11] 4,156,321

[45] May 29, 1979

[54] TRAP FOR INSECTS

[75] Inventors: Amedeo Capizzi; Pia Spinelli, both of Milan, Italy

[73] Assignee: Montedison S.p.A., Milan, Italy

[21] Appl. No.: 833,694

[22] Filed: Sep. 15, 1977

[30] Foreign Application Priority Data

Sep. 20, 1976 [IT] Italy .............................. 27392 A/76

[51] Int. Cl.² ............................................ A01M 1/14
[52] U.S. Cl. .................................................... 43/114
[58] Field of Search ......................................... 43/114

[56] References Cited

U.S. PATENT DOCUMENTS 3,863,384  2/1975  Weatherston et al. ................ 43/114

FOREIGN PATENT DOCUMENTS 222012  5/1910  Fed. Rep. of Germany ............. 43/114
33816  1/1922  Norway ..................................... 43/114

Primary Examiner—James L. Jones, Jr.
Attorney, Agent, or Firm—Morgan, Finnegan, Pine, Foley & Lee

[57] ABSTRACT

There is provided a trap for capturing insects, the trap containing a sticky glue and an attracting substance and consisting of two rectangular plates of paperboard or other suitable foldable material, the plates being arranged in the shape of overlapping bent tiles with facing concavities and placed transversely to each other, so as to form four openings along the four different sides of the rectangular plates.

6 Claims, 2 Drawing Figures

TRAP FOR INSECTS

BACKGROUND OF THE INVENTION

Traps for insects have recently come into use especially since particular attractive substances, such as sexual ferhormones, aggregating ferhormones, phagoattractants, etc., which offer the advantage of specifically attracting only a species without damaging useful species, or animals, or cultivations, have begun to be utilized in order to determine the development or to control the growth of the population of certain infesting or noxious species.

Traps for insects based on such principles are already known. Some of them, for example, are shaped as a box having in the surface delimiting it a number of such entrances or passages, such the insects, in order to reach the inside, must follow a sort of labyrinth or must slip through narrowings, which they are then unable to follow again to get out.

This article has proven to be very useful to catch insects alive, but the box-shaped trap has the drawback of being rather cumbersome and of not assuring the capture of a large number of insects. Many of them, in fact, do not succeed in reaching the inside, or they succeed in escaping through holes that have accidentally formed in the box.

According to a later technique, traps are constructed in which the active principle is placed near or above a liming paste, by which the insect is captured.

This is the principle on which the trap described in French Pat. No. 2,108,486 of Minnesota Mining and Manufacturing Co. is based. This patent illustrates a trap consisting of at least three surfaces radially arranged around a common axis and spread with a sticky substance suitable for capture the insects, the attracting substance being contained inside said surfaces, in suitable containers. The attracting substance may be contained also in a container arranged in the proximity of the axis common to the surfaces spread with the sticky substance.

The surfaces are fixed to the common axis, so that they can be folded against one another, like a book or a cover, so as to have minimum over-all dimensions when the trap is not being used.

This article, although it offers considerable advantages with respect to handling, has nevertheless a serious drawback: it is little fit for exposure to the open air. In fact, the atmospheric agents, such as rain, wind, sun, can wash away, remove and soil the glue-spread surfaces, or can alter the attracting substance which is employed.

Another type of trap is described in German Pat. No. 2,053,869 of said Minnesota Mining and Manufacturing Co. This relates to a trap for insects constructed with a waterproof paperboard plate, that is folded up on itself and can be opened so as to form a parallelepiped-like chamber having two opposite rhomboidal openings.

Such trap is hung by means of an iron wire hook fastened to one of the parallelepiped edges. The shape is retained by folding inwards a part of the trap walls in proximity of the openings. The trap's inside walls are thoroughly coated with glue. The attracting product can be applied onto the glue, in the form of proper formulations, such as, for example, beads of molten paraffin, with which the attractive substance has been admixed.

In this case the trap surface is in an internal position and, by consequence, is protected. Nevertheless, the trap, once placed in the open air, is rapidly damaged by the atmospheric agents due to the material it is made of.

OBJECTS OF THE INVENTION

An object of the present invention is to provide a new trap for insects. More particularly, such object consists in describing a trap for insects particularly easy to handle, to assemble and to disassemble, and characterized by an excellent efficiency.

DRAWINGS

FIG. 1 shows an embodiment of the improved trap of this invention. In it, the two rectangular surfaces 2 and 4, respectively are folded according to a line 6 and 8, respectively that is parallel with the shorter side 10 and 12 and intersects the longer sides 14 and 16 in their middle. When the trap is assembled, such two lines 6 and 8 result to be transversal to each other.

Figure 2:
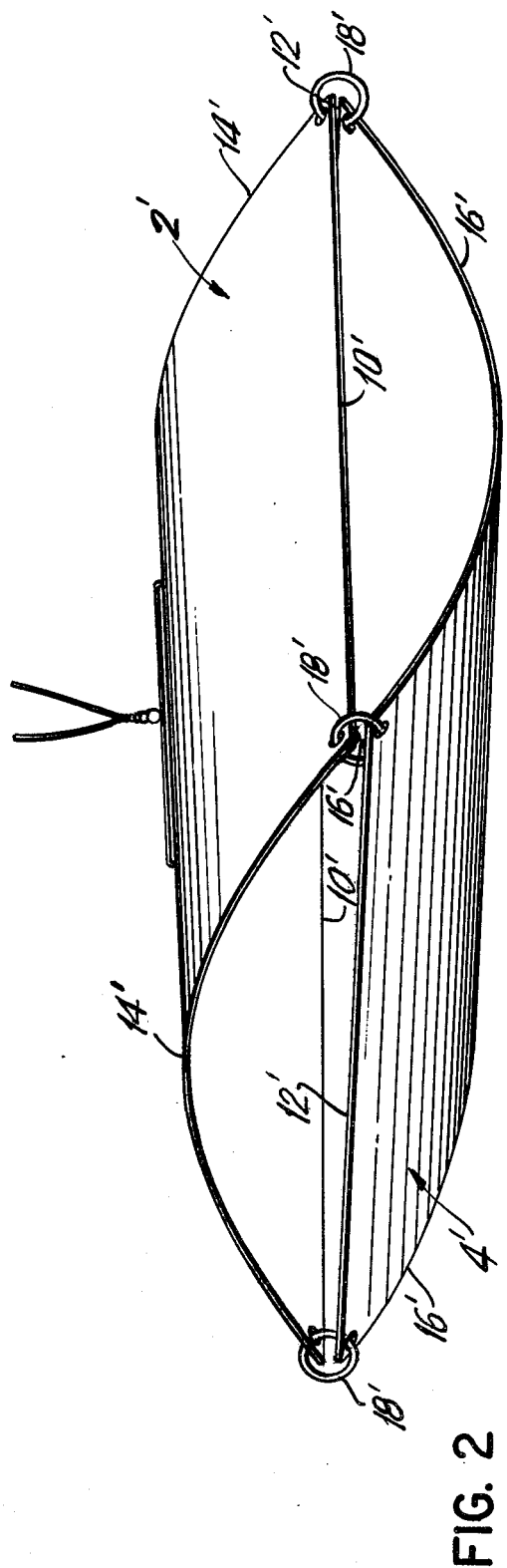

Another embodiment is the one illustrated in FIG. 2. According to this embodiment, the rectangular surfaces 2' and 4'are kept in arched form by the ties arranged along the edges of the long sides.

GENERAL DESCRIPTION OF THE INVENTION

We have now found a new trap, which is the object of this invention, that consists, when it is assembled, of two rectangular plates of equal dimensions, made of paperboard or of another suitable material, which are kept, by means of removable ties arranged on the longer board or on the edges, in the same position as overlapping bent tiles with facing concavities and placed transversally to each other.

After removal of the ties, the two bent tiles take up again their previous position of rectangular plates, wherefore they can be arranged either face to face, in the case that both surfaces, which become concave and facing when the ties are acting, should be spread with the sticky glue fit for catching the insects, or the glue-coated surface can be folded up on itself.

Suitably, the difference in length between the longer side and the shorter side of the rectangular surfaces constituting the trap is of about 10%; in these conditions the ties keeping the two plates, made of waterproof paperboard or of another suitable material, fixed on each other and in the form of a bent tile may be arranged on the edges.

In this way it is possible to extend to the utmost the glue-coated surface, to impart an equal width to the openings' surfaces and to prevent backwaters.

The advantages offered by such a solution are, among the others, that of facilitating as much as possible the conservation, transportation and assembly of the trap in the open field, hanging it on a tree branch, and that of favoring the stagnation of the attracting odor inside the trap where it reaches the maximum concentration. The insect, once slipped into the trap, in consequence of the lesser luminosity and of the attracting odor concentration, easily ends by knocking against the upper and the lower walls till remaining limed thereon.

To prepare this trap, one may use all of the materials exhibiting the desired characteristics of flexibility and impermeability both to water and to the glue spread on the bottom or on both faces turned inwards.

Plasticized or paraffined paperboards, as well as resins from acrylonitrile-butadiene-styrene, polyvinylchloride, filled polyethylene, etc., may be used for this purpose.

The glue employed to lime the trap bottom shall possess characteristics of persistence and resistance to the atmospheric agents, and it shall neither harden nor dry, but retain its consistency and adhesiveness unaltered for a long time. It must not acquire, in the long run, such odor which could interfere with the attracting substances. Its viscosity and consistency shall be such as to maintain a sufficient coating on the entire surface of the trap bottom without collecting in the lowest area.

Furthermore, all the above-mentioned characteristics must remain almost constant at the utilization temperature, that is, approximately from $+5°$ C. to $+50°$ C.

The glue can be spread, besides on the trap's inside walls or only on the lower wall, on a removable sheet lying on the trap bottom and adhering to the trap lower wall, due to gravity, or fixed to the bottom wall or to the upper wall by means of Scotch tape or other fixers ensuring the adhesion of said sheet, so that it can be easily replaced once it is too loaded with insects.

As glues, it is possible to use suitable mixtures of low butylene-isobutylene polymers or of other other olefins with an optional addition of oils, waxes, or other viscosity modifiers.

The attracting substance can be put into the trap in various ways. It can be either introduced into glass capillary tubes, or closed in capsules made of plastic material permeable to the attracting matter, or placed in open containers, or caused to impregnate rubber or other suited materials capable of regulating the release thereof to the atmosphere.

The ties that ensure the overlapping of the two rectangular surfaces of the traps and impart to them the form of a bent tile, may be rings, strings, split pins or any other suitable device.

The traps may be equipped with proper devices for being hung.

SPECIFIC DESCRIPTION OF THE INVENTION

The following examples are given to better illustrate the invention:

EXAMPLE 1

A trap according to this invention was prepared as follows: Two paperboard rectangles having a thickness of 0.8 mm and measuring 210×230 mm, coated with neutral color polyethylene on both surfaces were taken. Through rivets of 3.5 mm diameter were applied to the four angles of each rectangle. The centre of each bore was at a distance of 6 mm from the two next bores. On both rectangles a folding line was impressed, corresponding to the median line of the longer side.

In one of the two rectangles (acting as cover) two rivets were inserted along said line, at a distance of 45 mm from the boards. Onto a surface of the other rectangle (acting as bottom) glue was uniformly spread to form an about 2 mm thick layer, excluding an external band of about 15 mm. The glue used was "Stikem Special" produced by Michel & Pelton, Emeryville, California, U.S.A.

Both rectangles were folded by about 120° along the prearranged lines. An approximately 80 cm long plasticized wire having a 2-mm diameter was made to pass through the two central bores of the cover. The two wire portions projecting from the external side (convex part) were kinked for a short stretch. The two parts were drawn near to each other having taken care that the foldings were perpendicular to each other, i.e., that the shorter side (rectilinear side) of one rectangle was coinciding with the longer side (bent by 120°) of the other rectangle. Cover and bottom were connected by means of rings inserted through the bores with the rivet.

The rings used were made of polycarbonate with 5% of polyethylene, their inside diameter was of 15 mm and their section had a 2.5 mm diameter.

The rings were interrupted by an oblique cut. The employed material was considerably elastic; it permitted to open the rings thus facilitating the insertion into the bores and rendering impossible the yielding of same.

The trap was hung by means of the projecting portion of plasticized wire. A para rubber tipping plug for test tubes, measuring 9×15 mm, that was made to imbibe an amount of 0.1 to 1 mg of the synthetic sexual ferhormone relative to the insect species to be captured, was laid onto the glue-spread surface, inside the trap.

EXAMPLE 2

A trap according to another embodiment of the present invention was prepared in the following way:

Two 1 mm thick rectangles made of acrylonitrile-butadiene-styrene resin and measuring 210×230 mm were utilized.

A few bores of 3.5 mm diameter were made in the positions indicated in Example 1. In this case the bores did not need stiffening. A rectangle of polyethylene-coated paperboard having the same dimensions, but a 0.2-mm thickness and 4 bores in the angles was now taken. Onto this paperboard 8 g of the glue described in Example 1 were spread, whereon a tipping test tube plug made of para rubber and measuring 9×15 mm was placed, such plug having been made to absorb a suitable amount of the synthetic sexual ferhormone relative to the species to be captured.

The trap was assembled following the same modalities described in Example 1, using an identical plasticized wire and identical rings, after having caused the glue-spread paperboard to adhere to the trap bottom with the glue turned upward. The rings were made to pass also through the bores of the paperboard, that was so kept in position.

EXAMPLE 3

Three traps of Example 1 were mounted together with three traps prepared according to French Pat. No. 2,108,486, having three surfaces radially arranged around the common axis, and along with three commercial traps according to German Pat. No. 2,053,869, consisting in paperboard shaped as a parallelepiped with two lateral openings.

Into the traps according to the French patent, along the surfaces' coaxial position, there was placed a tipping plug for test tubes, made of para rubber like that of Example 1, imbued with 1 mg of the sexual ferhormone of Carpocapsa pomonella L. An identical plug imbued with 1 mg of the same substance was introduced into the traps conforming to the German patent and into the traps according to Example 1.

All the surfaces radially arranged around the common axis of the trap, according to the French patent, and both inside walls of the trap surfaces according to the present invention, were spread with the glue described in Example 1 for a thickness of 2 mm. The commercial traps according to the German patent had their inside walls already coated with the glue described in the relevant patent.

The nine traps were hung in an apple orchard in random positions, but at a distance of at least 50 m from one another. The chosen positions were fully equivalent as regards the exposure to the winds and to the atmospheric agents.

During the first week the averages of the captured male individuals of Carpocapsa pomonella attained by the traps according to Example 1 and according to the German patent did not exhibit any statistically meaningful difference, while the average of the captures effected by the traps according to the French patent resulted by far lower. This was due to the fact that the trap in question was evidently less capable of forming a concentration gradient of the odorous substance placed in a too exposed position, as well as to the fact that the glue-spread surface of the trap, though larger, was rapidly dirtied by materials carried by the wind (leaves, etc.) and by insects (in particular the Diptera) tht happened to run thereinto during their flight.

Continuing the test after the first week, it was noticed that the traps according to the German patent got easily deformed under the action of the rain; the shape of the side openings was substantially modified; in the inside there was a water stagnation that caused a loss of adhesiveness, and, by consequence, of captures.

The traps according to the French patent quickly lost any effectiveness due to the reasons mentioned hereinbefore, as well as because during the normal treatments with pesticides the atomized products deposited onto the glue-coated surface and onto the attractive product distributor, thus lessening the trap activity.

Conversely, the traps according to Example 1 retained their effectiveness for several weeks, did not become deformed owing to inclement weather and the pesticides, if any, deposited only outside the trap, without causing any trouble.

What is claimed is:

1. A trap for capturing insects, containing a sticky glue and an attractant, which consists of two rectangular plates made of paperboard or other suitable foldable material, said plates being kept by removable ties arranged along the long edges in the shape of overlapped bent tiles with facing concavities and placed transversely to each other, in order to form four openings along the four sides of the rectangular plates.

2. A trap according to claim 1, charcterized in that the differences in length between the longer side and the shorter side of the rectangular surfaces are of about 10%, and the ties are arranged on the edges.

3. A trap according to claim 1 in which the glue is spread on a paperboard or another removable plate arranged by gravity on the lower bent tile.

4. A trap according to claim 1, characterized in that the glue is spread on two paperboards or other removable plates arranged, by means of suitable fixers, on the inside walls of the two bent tiles, which are opposite and transverse to each other.

5. A trap according to claim 1, characterized in that the sticky glue is spread on the inside surface of the lower bent tile, and that said bent tile can be folded on itself along the median line relative to the longer side.

6. A trap according to claim 1, characterized in that the sticky glue is spread on both of the inside surfaces of the bent tiles which are opposite and transverse to each other.

* * * * *